US009528547B2

United States Patent
Hosen et al.

(10) Patent No.: US 9,528,547 B2
(45) Date of Patent: Dec. 27, 2016

(54) DUST COVER FOR BALL JOINT

(71) Applicant: NOK CORPORATION, Tokyo (JP)

(72) Inventors: Tatsuro Hosen, Makinohara (JP); Koji Kanagawa, Makinohara (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 14/895,355

(22) PCT Filed: Jun. 3, 2014

(86) PCT No.: PCT/JP2014/064660
§ 371 (c)(1),
(2) Date: Dec. 2, 2015

(87) PCT Pub. No.: WO2014/208286
PCT Pub. Date: Dec. 31, 2014

(65) Prior Publication Data
US 2016/0102703 A1    Apr. 14, 2016

(30) Foreign Application Priority Data

Jun. 25, 2013 (JP) .................................. 2013-132400

(51) Int. Cl.
F16B 7/10 (2006.01)
F16C 11/00 (2006.01)
(Continued)

(52) U.S. Cl.
CPC ............ *F16C 11/0671* (2013.01); *F16J 3/042* (2013.01); *F16J 15/52* (2013.01)

(58) Field of Classification Search
CPC ........ F16C 11/06; F16C 11/0671; F16J 3/042; F16J 15/52; F16J 15/061
(Continued)

(56) References Cited

U.S. PATENT DOCUMENTS 3,381,987 A * 5/1968 Husen ................. F16C 11/0671
277/635
4,220,418 A * 9/1980 Kondo ..................... B62D 7/18
277/391
(Continued)

FOREIGN PATENT DOCUMENTS

JP    S61175667 U    11/1986
JP    S62137408 U    8/1987
(Continued)

OTHER PUBLICATIONS

Extended European Search Report for Application No. EP 14 81 8263 dated Jun. 9, 2016 (8 pages).

*Primary Examiner* — Gregory Binda
*Assistant Examiner* — Nahid Amiri
(74) *Attorney, Agent, or Firm* — Harness, Dickey & Pierce, P.L.C.

(57) ABSTRACT

In a dust cover for a ball joint in which a one end large-diameter opening portion is retained to an outer peripheral surface of a socket, the other end small-diameter opening portion is constructed by a tube portion fitted and fixed onto an outer peripheral surface of a shaft, and an outward flange portion extending diametrically outward from an end portion in the socket side of the tube portion, and the dust cover is retained onto a L-shaped hard retainer, a reinforcing ring of the other end small-diameter opening portion is constructed by a cylindrical portion and an inward flange portion extending toward an outer peripheral surface of the retainer from an end portion in the knuckle side of the cylindrical portion, and an end portion in the socket side of the cylindrical portion in the reinforcing ring comes into contact with the outward flange portion of the retainer.

2 Claims, 4 Drawing Sheets

(51) Int. Cl.
*F16J 15/52* (2006.01)
*F16L 51/02* (2006.01)
*F16C 11/06* (2006.01)
*F16J 3/04* (2006.01)

(58) Field of Classification Search
USPC ............ 403/50, 51, 134, 288; 277/635, 637
See application file for complete search history.

(56) References Cited

U.S. PATENT DOCUMENTS

| | | | | |
|---|---|---|---|---|
| 5,100,254 | A * | 3/1992 | Wasada | F16C 11/0671 403/134 |
| 6,814,521 | B2 * | 11/2004 | Suzuki | B60G 7/005 277/635 |
| 7,070,355 | B2 * | 7/2006 | Abels | F16C 11/0671 277/634 |
| 7,441,979 | B2 * | 10/2008 | Heidemann | F16C 11/0671 403/134 |
| 7,510,344 | B2 * | 3/2009 | Kondoh | B62D 7/166 403/135 |
| 2003/0156896 | A1 | 8/2003 | Suzuki et al. | |
| 2003/0202842 | A1 * | 10/2003 | Abels | F16C 11/0671 403/134 |
| 2004/0028302 | A1 * | 2/2004 | Abels | F16C 11/0671 384/206 |
| 2005/0042022 | A1 | 2/2005 | Abels et al. | |
| 2007/0092329 | A1 * | 4/2007 | Heidemann | F16C 11/0671 403/134 |
| 2012/0141192 | A1 * | 6/2012 | Kwon | B60G 7/005 403/135 |

FOREIGN PATENT DOCUMENTS

| | | |
|---|---|---|
| JP | H01128066 U | 8/1989 |
| JP | H02022413 U | 2/1990 |
| JP | H44520 U1 | 1/1992 |
| JP | H05019633 U | 3/1993 |
| WO | WO-2014-020980 A1 | 2/2014 |

* cited by examiner

DUST COVER FOR BALL JOINT

CROSS-REFERENCE TO RELATED APPLICATIONS

This application is a U.S. National Phase Application under 35 U.S.C. 371 of International Application No. PCT/JP2014/064660, filed Jun. 3, 2014 and published in Japanese as WO 2014/208286 A1 on Dec. 31, 2014. This application claims priority to Japanese Patent Application 2013-132400, filed on Jun. 25, 2013. The entire disclosures of the above applications are incorporated herein by reference.

BACKGROUND OF THE INVENTION

Field of the Invention

The present invention relates to a dust cover for a ball joint.

Further, the present invention relates to a dust cover for a ball joint which is used in an automobile suspension device, and a steering device.

Description of the Conventional Art

Conventionally, as a ball joint to which a dust cover is installed for the purpose of a dust prevention and a water prevention in a ball joint coupling portion, there has been known a dust cover for a ball joint which is described in FIG. 5 (Japanese Unexamined Patent Publication No. 62-137408).

In a seal structure of this kind of ball joint dust cover, a spherical head portion 200 formed in one end of a ball stud 100 is retained within a socket 300.

Further, a shaft 400 in the other end of the ball stud 100 is fastened and fixed to a knuckle 500.

On the other hand, a one end large-diameter opening portion 800 formed into an approximately C-shaped cross section of a dust cover 600 made of an elastic material is fitted and retained into an annular groove portion 310 which is formed in an outer peripheral surface of the socket 300 by an annular presser bar ring 700, and the other end small-diameter opening portion 150 in which a metal reinforcing ring formed into an L-shaped cross section is embedded is retained to the shaft 400. Further, a rubber existing between the metal reinforcing ring and the shaft 400 is appropriately compressed, and a sealing performance is achieved in relation to an oscillating motion of the ball stud 100 on the basis of a repulsive force (a tension force) and a following property of the rubber.

However, when this kind of conventional dust cover 600 made of the elastic material oscillates in a state in which the ball stud 100 is inclined as shown in FIG. 5, a force elongating the small-diameter opening portion 150 is applied to the dust cover 600 in a side where a film portion of the dust cover 600 made of the elastic material extends (a right side on the drawing). As a result, there is generated a so-called opening phenomenon of the small-diameter opening portion 150 is generated so that contact between a lip portion of the small-diameter opening portion 150 and the knuckle 500 is disengaged.

As a result, a sealing performance in the small-diameter opening portion 150 is lowered, and there has been a problem that earth and sand or refuse enters into the dust cover 600.

Particularly, the rubber constructing the dust cover 600 made of the elastic material loses its elasticity under a low-temperature atmosphere, and a following property of the film portion to the oscillating motion of the ball joint is lowered. As a result, it has been known that an opening phenomenon that the seal lip portion moves away from the shaft 400 is significantly generated.

Further, in the case that the opening phenomenon mentioned above is generated, not only the earth and sand or the refuse enters into the dust cover 600 from an external portion, but also there has been brought about a danger that grease sealed within the dust cover 600 leaks out.

As a countermeasure for reducing the opening phenomenon mentioned above, there has been proposed a dust cover for a ball joint which intends to improve the sealing performance against the oscillating motion of the ball stud by installing a retainer to a shaft side of the ball stud, however, this countermeasure is not sufficient (Japanese Unexamined Utility Model Publication No. 4-4520).

SUMMARY OF THE INVENTION

Problem to be Solved by the Invention

The present invention is made by taking the problem mentioned above into consideration, and an object of the present invention is to provide a dust cover for a ball joint which suppresses generation of a so-called opening phenomenon of a small-diameter opening portion that contact between the small-diameter opening portion and a shaft is disengaged, even under a low-temperature atmosphere, and has a good sealing performance of the small-diameter opening portion.

Means for Solving the Problem

A dust cover for a ball joint according to the present invention is a dust cover for a ball joint comprising:

a spherical head portion formed in one end of a ball stud, the spherical head portion being retained within a socket;

a shaft in the other end of the ball stud, the shaft being fastened and fixed to a knuckle;

a one end large-diameter opening portion being fixed and retained to an outer peripheral surface of the socket; and the other end small-diameter opening portion in which a reinforcing ring made of a hard material is integrally formed is retained onto a retainer formed into an L-shaped cross section, made of a hard material and constructed by a tube portion which is fitted and fixed onto an outer peripheral surface of the shaft, and an outward flange portion which extends outward in a diametrical direction from an end portion in the socket side of the tube portion, wherein the reinforcing ring is constructed by a cylindrical portion and an inward flange portion which extends toward an outer peripheral surface of the retainer from an end portion in the knuckle side of the cylindrical portion, and an end portion in the socket side of the cylindrical portion in the reinforcing ring comes into contact with the outward flange portion of the retainer.

Effect of the Invention

The present invention achieves the following effects.

According to the dust cover for the ball joint of the invention described in the first aspect, since the end portion of the cylindrical portion in the reinforcing ring integrally formed in the other end small-diameter opening portion and made of the hard material is structured such as to come into contact with the outward flange of the retainer which is fitted and fixed onto the outer peripheral surface of the shaft, it is possible to suppress generation of a so-called opening phenomenon of the other end small-diameter opening portion, that is, disengagement of the contact between the other end small-diameter opening portion and the shaft, even under the low-temperature atmosphere, and it is possible to well maintain a sealing performance of the other end small-diameter opening portion.

Further, according to the dust cover for the ball joint of the invention described in a second aspect, since the inward flange portion of the reinforcing ring is structured such as to come into contact with an outer peripheral surface of the tube portion in the retainer, it is possible to more securely suppress the generation of the opening phenomenon of the other end small-diameter opening portion, and it is possible to well maintain the sealing performance of the other end small-diameter opening portion.

Further, according to the dust cover for the ball joint of the invention described in a third aspect, since a dust lip coming into contact with the knuckle is provided at a position which corresponds to the inward flange portion of the other end small-diameter opening portion, it is possible to apply a sufficient compression margin to the dust lip, and it is possible to improve a sealing performance of the dust lip.

DETAILED DESCRIPTION OF PREFERRED EMBODIMENT

Figure 1:
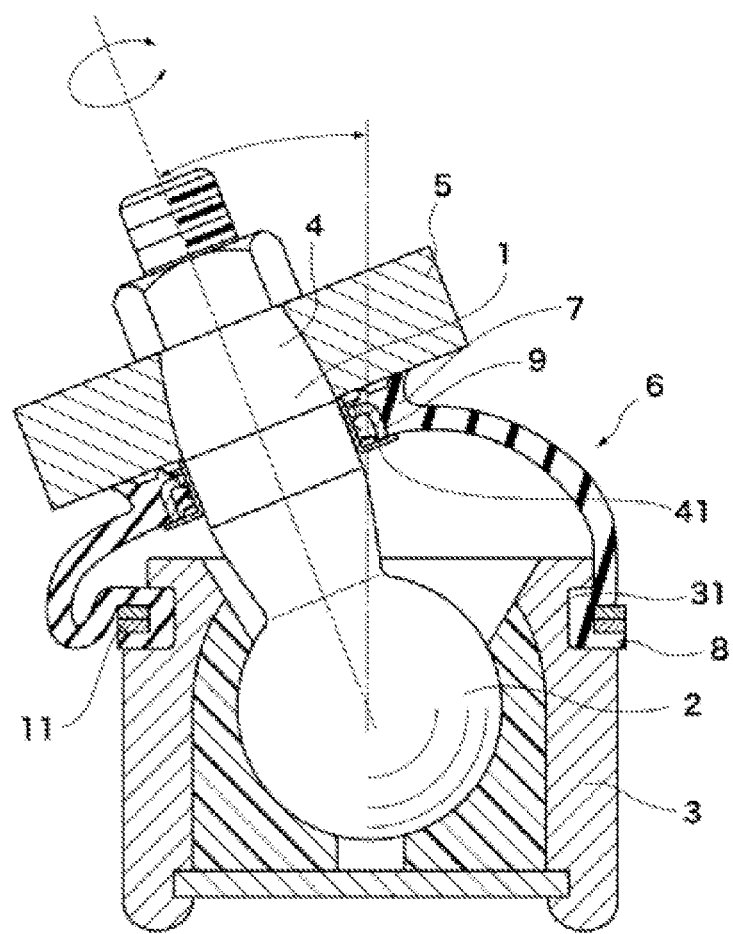
FIG. 1 is a vertical cross sectional view of a dust cover for a ball joint according to the present invention.

A description will be given below of a mode for carrying out the present invention.

As shown in FIGS. 1, 2, 3 and 4, a dust cover 6 for a ball joint according to the present invention has a basic structure in which a spherical head portion 2 molded in one end of a ball stud 1 is retained within a socket 3, a shaft 4 in the other end of the ball stud 1 is fastened and fixed to a knuckle 5, a one end large-diameter opening portion 8 is fixed and retained to an outer peripheral surface of the socket 3, the other end small-diameter opening portion 7 in which a reinforcing ring 9 made of a hard material is integrally formed is retained onto a retainer 41 formed into an L-shaped cross section, made of a hard material and constructed by a tube portion 411 which is fitted and fixed onto an outer peripheral surface of the shaft 4, and an outward flange portion 412 which extends outward in a diametrical direction from an end portion in the socket 3 side of the tube portion 411.

The reinforcing ring 9 integrally formed in the other end small-diameter opening portion 7 is constructed by a cylindrical portion 91, and an inward flange portion 92 which extends toward an outer peripheral surface of the retainer 41 from an end portion in the knuckle 5 side of the cylindrical portion 91.

Further, an end portion 912 in the socket 3 side of the cylindrical portion 91 of the reinforcing ring 9 comes into contact with the outward flange portion 412 of the retainer 41.

According to the structure mentioned above, for example, in the case that the ball stud 1 oscillates in a state in which the ball stud 1 is inclined as shown in FIG. 1, a force pulling the other end small-diameter opening portion 7 to the spherical head portion 2 side (a lower side in the drawing) acts in a side (a right side in the drawing) where a film portion of the dust cover 6 made of an elastic material extends, however, the cylindrical portion 91 of the reinforcing ring 9 comes into contact with the outward flange portion 412 of the retainer 41 which is fitted and fixed onto the outer peripheral surface of the shaft 4, thereby inhibiting the other end small-diameter opening portion 7 from moving (moving in an axial direction) to the spherical head portion 2 side. As a result, it is possible to suppress generation of the so-called opening phenomenon of the other end small-diameter opening portion 7, that is, the disengagement of the contact between the other end small-diameter opening portion 7 and the shaft 4, even under a low-temperature atmosphere, and it is possible to well maintain the sealing performance of the other end small-diameter opening portion 7.

Further, since a diametrically inner end portion 921 of the inward flange portion 92 is structured such as to come into contact with the outer peripheral surface of the tube portion 411 of the retainer 41, it is possible to inhibit the other end small-diameter opening portion 7 from moving (moving in a diametrical direction) to the shaft 4 side. As a result, it is possible to more securely suppress the generation of the opening phenomenon of the other end small-diameter opening portion 7, and it is possible to well maintain the sealing performance of the other end small-diameter opening portion 7.

Figure 2:
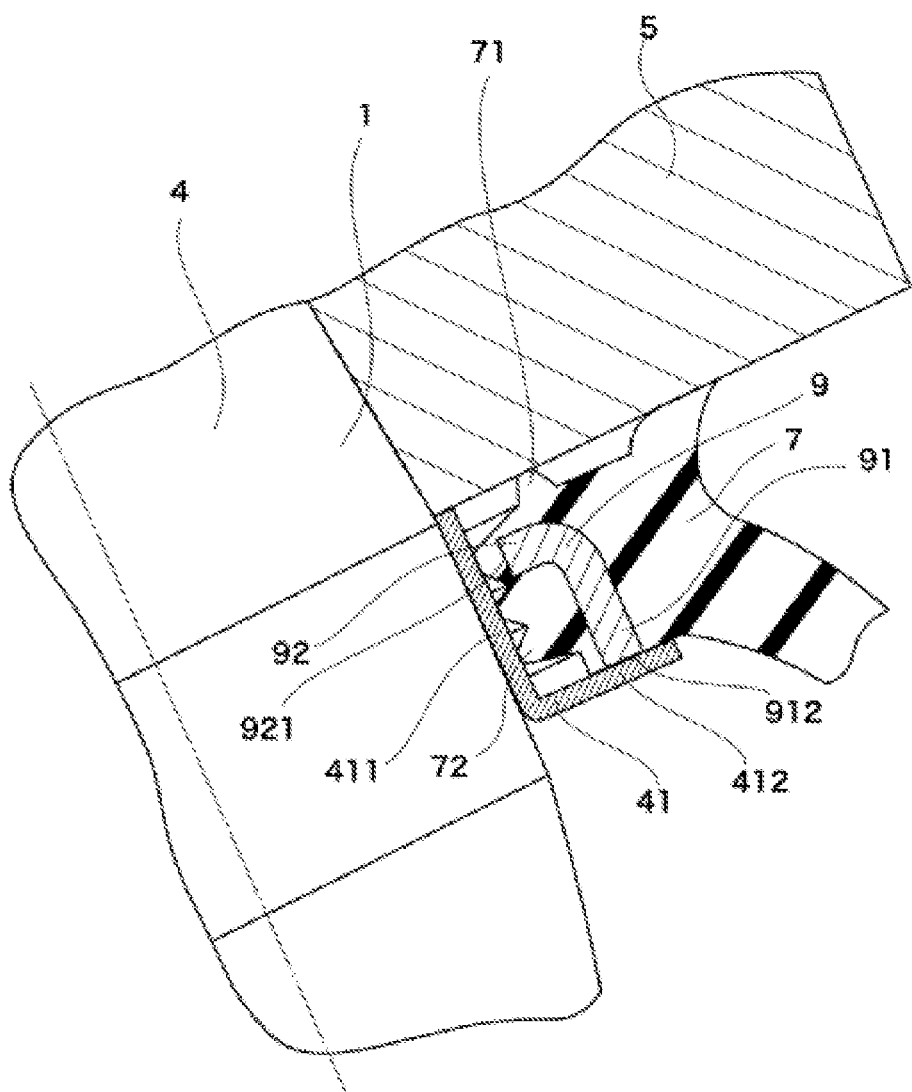
FIG. 2 is a partly enlarged view of FIG. 1.
Figure 3:
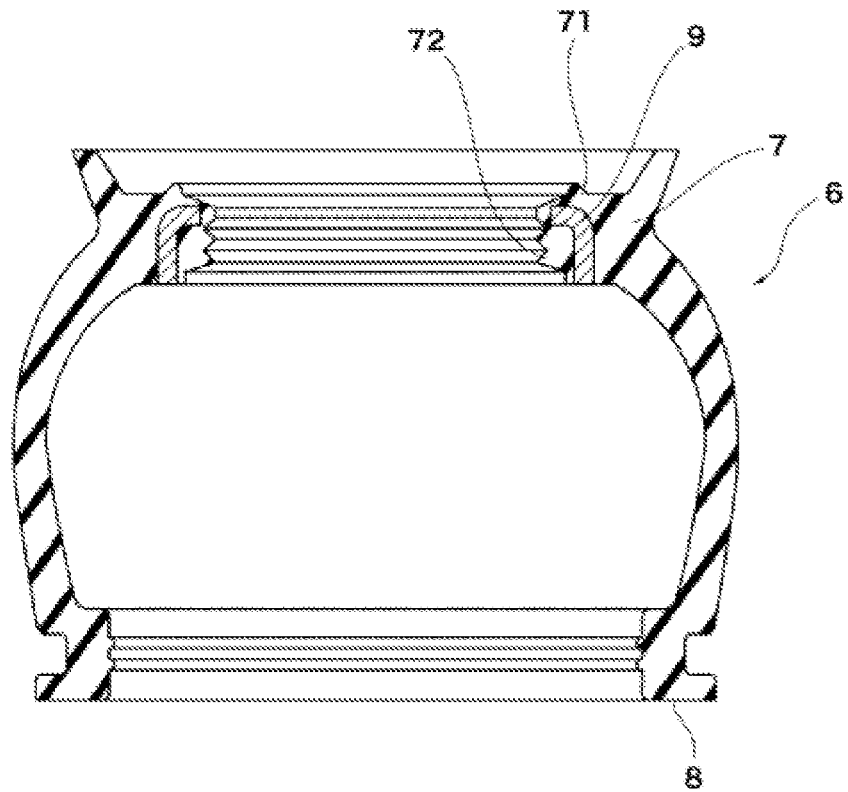
FIG. 3 is a vertical cross sectional view before installation of the dust cover shown in FIG. 1.

Further, according to a structure in which a dust lip 71 coming into contact with the knuckle 5 is provided at a position which corresponds to the inward flange portion 92 of the other end small-diameter opening portion 7 as shown in FIG. 2, the dust lip 71 can apply a sufficient compression margin between the inward flange portion 92 and the knuckle 5. As a result, it is possible to improve a sealing performance of the dust lip 71.

Figure 4:
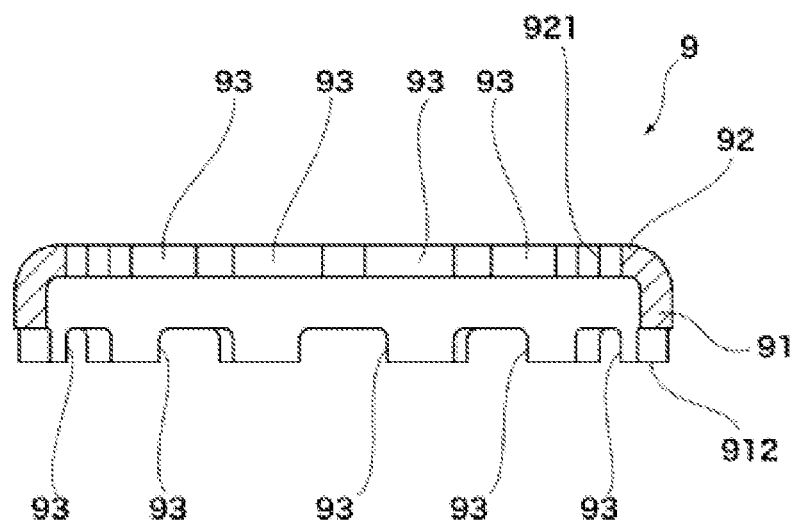
FIG. 4 is a vertical cross sectional view of a reinforcing ring which is used in FIG. 1.
Figure 5:
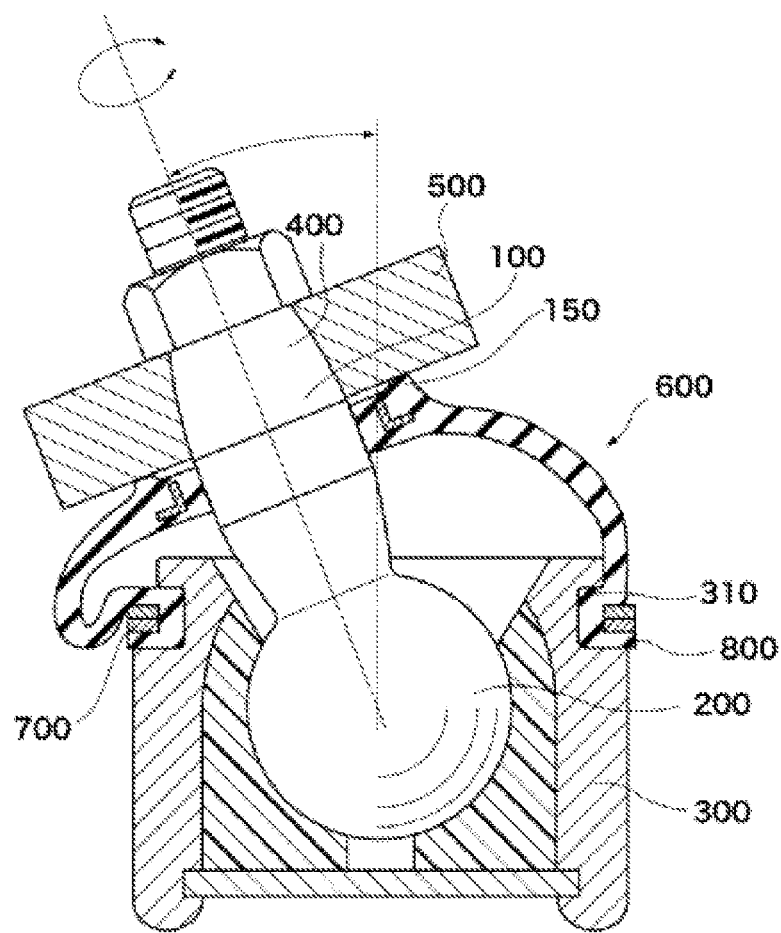
FIG. 5 is a vertical cross sectional view of a dust cover for a ball joint according to a prior art.

Further, the reinforcing ring 9 is constructed by a cylindrical portion 91, and an inward flange portion 92 which extends toward the outer peripheral surface of the retainer 41 from an end portion in the knuckle 5 side of the cylindrical portion 91. Specifically, as shown in FIG. 4, notch portions 93 are formed circumferentially uniformly in the cylindrical portion 91 and the inward flange portion 92.

On the basis of existence of the notch portions 93, it is possible to integrally mold easily the seal lip 72 existing so as to be surrounded by the reinforcing ring 9 in an inner peripheral surface of the other end small-diameter opening portion 7. Through holes may be provided in place of the notch portions 93.

Further, a metal material and a resin material can be appropriately selected and employed as a material of the reinforcing ring 9 and the retainer 41.

Further, a material of the dust cover 6 is selected and used in conformity to an intended use, from a rubber-like elastic material such as chloroprene, a polyester elastomer, and a thermoplastic elastomer such as a thermoplastic polyurethane.

Further, grease is sealed into the dust cover 6.

On the other hand, the one end large-diameter opening portion 8 approximately formed into a C-shaped cross section of the dust cover 6 is structured such as to be fixed and retained into an annular groove portion 31 formed in the outer peripheral surface of the socket 3, by an annular presser bar ring 11.

Further, the presser bar ring 11 employs a circlip approximately formed into a rectangular cross section, however, various presser rings can be employed in correspondence to intended uses, for example, a type obtained by burying and integrating a metal reinforcing ring in the one end large-diameter opening portion 8.

Further, it goes without saying that the present invention is not limited to the best mode for carrying out the invention mentioned above, but can employ various structures without deflecting from the scope of the present invention.

INDUSTRIAL APPLICABILITY

The present invention can be used in a ball joint which is used in a suspension device and a steering device of an automobile.

What is claimed is:

1. A ball joint assembly, comprising:
a spherical head portion formed in one end of a ball stud, the spherical head portion being retained within a socket;
a shaft in the other end of said ball stud, the shaft being fastened and fixed to a knuckle;
a dust cover including a large-diameter opening portion being fixed and retained to an outer peripheral surface of said socket, and a small-diameter opening portion constructed by a tube portion which is fitted and fixed onto an outer peripheral surface of said shaft, and an outward flange portion which extends outward in a diametrical direction from an end portion in a socket side of said tube portion, the small-diameter opening portion in which a reinforcing ring made of a hard material is integrally formed; and
a retainer that is L-shaped in cross section and is made of a hard material, the dust cover being coupled to the retainer,
wherein said reinforcing ring is constructed by a cylindrical portion and an inward flange portion which extends toward an outer peripheral surface of said retainer from an end portion in a knuckle side of said cylindrical portion, and an end portion in said socket side of said cylindrical portion in said reinforcing ring comes into contact with the outward flange portion of said retainer and a diametrically inner end portion of said inward flange portion comes into contact with an outer peripheral surface of said tube portion.

2. The dust cover for the ball joint according to claim 1, wherein a dust lip coming into contact with said knuckle is provided at a position which corresponds to said inward flange portion of said other end small-diameter opening portion.

* * * * *